United States Patent
Allred, Jr.

(10) Patent No.: US 11,512,241 B2
(45) Date of Patent: Nov. 29, 2022

(54) METHOD OF TREATING PIPELINE

(71) Applicant: Riddle's Dehi & Chemical Services Co., Inc., Kilgore, TX (US)

(72) Inventor: James A. Allred, Jr., Alba, TX (US)

(73) Assignee: Riddle's Dehi & Chemical Services Co., Inc., Kilgore, TX (US)

( * ) Notice: Subject to any disclaimer, the term of this patent is extended or adjusted under 35 U.S.C. 154(b) by 16 days.

(21) Appl. No.: 17/391,390

(22) Filed: Aug. 2, 2021

(65) Prior Publication Data

US 2021/0355367 A1 Nov. 18, 2021

Related U.S. Application Data

(63) Continuation-in-part of application No. 16/741,225, filed on Jan. 13, 2020, now Pat. No. 11,077,474.

(51) Int. Cl.
*C09K 8/52* (2006.01)

(52) U.S. Cl.
CPC .......... *C09K 8/52* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 4,425,385 A | 1/1984 | Coulter et al. | |
| 4,579,596 A | 4/1986 | Murzyn | |
| 6,986,358 B2 | 1/2006 | Mattox et al. | |
| 7,544,726 B2 | 6/2009 | Greenwood | |
| 2010/0096139 A1 | 4/2010 | Holcomb et al. | |
| 2012/0168165 A1 | 7/2012 | Holcomb et al. | |
| 2014/0072653 A1 | 3/2014 | Buschmann et al. | |
| 2014/0374095 A1 | 12/2014 | Ladva et al. | |
| 2016/0017204 A1 | 1/2016 | Hill et al. | |
| 2017/0088767 A1 | 3/2017 | Talley | |
| 2018/0291255 A1 | 10/2018 | Southwell | |
| 2018/0291261 A1 | 10/2018 | Southwell | |
| 2019/0078015 A1 | 3/2019 | Southwell et al. | |
| 2019/0093462 A1 | 3/2019 | Watts et al. | |

(Continued)

FOREIGN PATENT DOCUMENTS

WO WO2010070354 A1 6/2010

OTHER PUBLICATIONS

Nissan Chemical America Corporation, nanoActiv® Product Information Sheet, 2019, pp. 1-4.

(Continued)

*Primary Examiner* — Eric W Golightly
(74) *Attorney, Agent, or Firm* — Grady K. Bergen; Griggs Bergen LLP

(57) ABSTRACT

A method of treating a pipeline is performed by selecting a colloidal particle dispersion having inorganic nanoparticles with an average particle size of from 500 nm or less that exhibit properties of Brownian motion that facilitate penetration of solid deposits on interior surfaces of a pipeline. A treatment composition comprising the colloidal particle dispersion is introduced into an interior of a pipeline by at least one of (A) introducing a batch amount of the treatment composition in a selected volume into the interior of the pipeline, and (B) continuously introducing the treatment composition at a selected rate into the interior of the interior of the pipeline. The composition is allowed to act upon the surfaces and materials adhering to the surfaces of the interior of the pipeline.

20 Claims, 3 Drawing Sheets

(56) References Cited

U.S. PATENT DOCUMENTS

2019/0136123 A1 5/2019 Holcomb et al.
2019/0225871 A1 7/2019 Southwell

OTHER PUBLICATIONS

International Search Report and Written Opinion dated Apr. 2, 2021 in counterpart International PCT Application No. PCT/US2021/012940.

METHOD OF TREATING PIPELINE

CROSS-REFERENCE TO RELATED APPLICATIONS

This application is continuation-in-part of U.S. patent application Ser. No. 16/741,225, filed Jan. 13, 2020, now U.S. Pat. No. 11,077,474, issued Aug. 3, 2021, which is hereby incorporated by reference in its entirety for all purposes.

TECHNICAL FIELD

The invention relates to methods of cleaning pipelines using particular treatment compositions.

BACKGROUND

Pipelines are used throughout the world to efficiently and economically transport large quantities of fluids over great distances. Some of these pipelines may be hundreds and sometimes thousands of miles in length, particularly those used to transport crude and refined petroleum oil, natural gas, chemicals, etc. Over time, the interior surfaces of the pipeline can become coated with deposits that can restrict and eventually block flow. These deposits may include corrosion byproducts, scale, mineral deposits, sand, silica, hydrocarbons, paraffins, asphaltenes, metal oxides, iron oxides, solids, biofilm, and water.

Pipelines used for these fluids are typically formed from metals, such as carbon steel. While the exterior of the pipelines are typically painted or covered with a protective coating to prevent corrosion, the interior of the pipelines are typically unprotected or bare metal so that they are subject to corrosion. Cathodic corrosion protection, where a small electrical current is applied to the pipeline so that it becomes cathodic, can offer some protection against internal pipe corrosion, but this does not prevent all corrosion.

Additionally, the deposits that form on the interior surfaces of the pipeline can form corrosion cells in which under-deposit corrosion can occur. Such corrosion cells require the presence of water in the pipeline, which forms the electrolyte in the corrosion cell. This water is typically present in the pipeline as entrained water within the transported fluids. Fluids that are conveyed through pipelines typically contain some water. Even dry natural gas has some amount of water (e.g., 4-7 lbs water/MMSCF of gas) that allows the formation of corrosion cells. The water can penetrate these surface deposits becoming entrapped under the deposit to form the corrosion cell and facilitate the under-deposit corrosion.

There are various sources of these corrosion causing materials. This can include carbon dioxide ($CO_2$) and hydrogen sulfide ($H_2S$) that may be present in the transported fluids. Carbon dioxide hydrates in the presence of water to form carbonic acid ($H_2CO_3$). The acid in turns reacts with the iron or steel to form corrosion. The hydrogen sulfide also reacts with the iron or steel material of the pipeline to form iron sulfides, thus corroding and degrading the pipe. These materials can penetrate the surface deposits to form the corrosion cells.

Microbiologically influenced corrosion (MIC) from microbes or bacteria that may be present in the fluids is also a source of corrosion. These microbes or bacteria may attach to the internal surfaces of the pipeline or under the surface deposits and grow as a colony to form a biofilm on the surfaces of the pipe. These microbes are often present in fluids produced from subterranean formations, such as oil and gas wells. The microbes are typically chemoautotrophs, which obtain energy by the oxidation of electron donors from their surroundings. One type of such microbes are sulfate-reducing bacteria (SRB). SRBs utilize sulfate ions ($SO_4^{2-}$) that are reduced to $H_2S$. Water within the pipeline will interact with the metal surfaces to create a layer of molecular hydrogen. The SRBs through anaerobic respiration will then utilize the sulfate ions so that the hydrogen layer on the walls of the pipeline is oxidized to $H_2S$, which in turns reacts with iron to form iron sulfides. Another type of MIC that leads to corrosion in pipelines is that produced by acid producing bacteria (APB). ABPs undergo anaerobic fermentation instead of anaerobic respiration, producing acids as part of their growth cycle. These produced acids lead to the acid corrosion of the metal materials of the pipeline.

To remove these deposits, coatings, and other detrimental materials, a maintenance program is carried out. This essentially involves passing a projectile, commonly referred to as a "pig," down the interior of the pipeline so that the deposits are physically scraped off the sides of the pipeline as the pig is moved through the pipeline. This process, referred to as "pigging" is sometimes done in conjunction with a chemical treatment. Pigging treatments are usually conducted "online" without interfering with the transporting of fluids. While such treatments have been used with limited success, improvements are needed.

BRIEF DESCRIPTION OF THE DRAWINGS

For a more complete understanding of particular embodiments of the invention, and the advantages thereof, reference is now made to the following descriptions taken in conjunction with the accompanying figures, in which.

DETAILED DESCRIPTION

Figure 1:
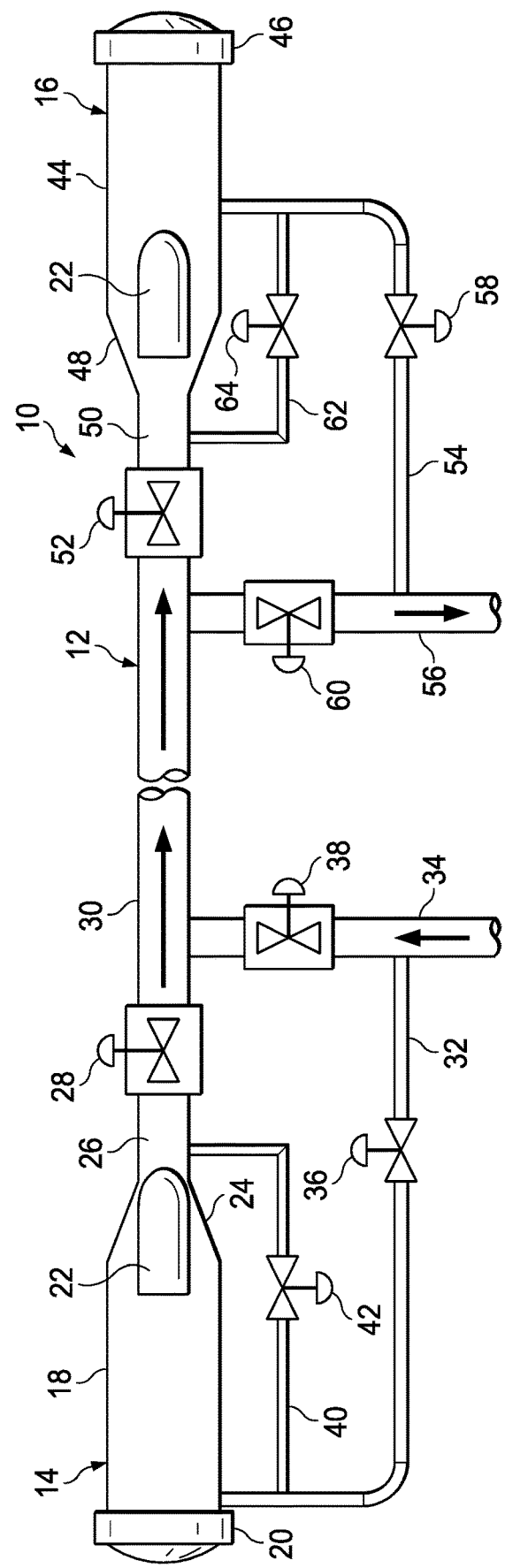
FIG. 1 is a schematic of a pipeline and pipeline segment having a pig launcher and receiver for passing a pig through the pipe to facilitate cleaning of the pipeline.

The present invention involves a method of cleaning a pipeline wherein a particular treatment composition is used in combination with one or more pigging operations. Referring to FIG. 1, a schematic of an exemplary pipeline 10 having a pipeline segment 12 is shown to illustrate the treatment method. The pipeline 10 may be any pipeline used for gathering, conveying and transporting fluids where the interior of the pipeline may require routine or periodic cleaning and maintenance. This may include pipelines used for gathering and/or transporting hydrocarbons, such as crude and refined petroleum oil, natural gas, natural gas liquids (NGS), chemicals, bio-oils, biofuels, etc. The pipeline may also be used to transport water or other aqueous fluids in certain instances. The pipeline 10 and/or pipeline segment 12 may be of varying lengths, from several feet to many miles.

The pipe and components of the pipeline are typically formed of metal materials. These may include iron, aluminum, copper, metal alloys, and the like. In most applications, the pipelines or portions thereof are formed from iron or steel, such as carbon steel, mild or low carbon steel, cast iron, stainless steel, etc. In some instances, non-metal materials may also be used for the pipelines or portions thereof. These may include materials such as clay, plastic or polymeric materials, PVC, polypropylene, fiberglass, etc. For pipelines used for transporting natural gas and petroleum products, the pipelines are typically constructed from carbon steel.

The pipe of the pipeline or pipeline segment may be of various widths or diameters, from a fraction of an inch or a few inches to several feet (e.g., from ¼ in to 5 ft or more.) in diameter. For pipelines used for transmission of fluids over great distances, such as natural gas and petroleum products, the pipelines are typically quite large in diameter (e.g., 24 to 42 inches).

The pipeline 10 may be divided into a number of different pipeline sections or segments 12 along its length. The pipeline segments 12 facilitate maintenance, operation and inspection of portions of the pipeline 10. The pipe segment 12 may have a uniform diameter along its length. Each segment 12, which may itself be several hundred feet to many miles in length, may be provided with a pig launcher assembly 14 at one end and a pig receiver assembly 16 at an opposite end. The launcher and receiver assemblies 14, 16 shown and described herein are exemplary of those commonly used in pipelines. Variations of these assemblies may also be used.

The pig launcher assembly 14 is located at an upstream end of the pipe segment 12 relative to the direction of fluid flow within the pipeline. Similarly, the pig receiver assembly 16 is located on a downstream end of the pipe segment 12. The launcher assembly 14 has an enlarged or major barrel or pipe portion 18 with opening at the end of the barrel 18 for accessing the interior of the barrel 18. An access door or closure 20 is provided for selectively accessing and closing off the end opening of the barrel 18. This also allows for the introduction of a pig or body 22 as well as other items or materials into the barrel 18.

The pig or body 22 may have a variety of configurations and constructions depending on its purpose. These can include mandrel pigs, foam pigs, solid cast pigs, etc. In the treatment methods disclosed herein, at least one pig or body is sized and configured to apply, spread or coat a treatment composition on the interior surfaces of the pipeline. Such pigs or bodies may have a reduced diameter or diameter portion to facilitate spreading of the treatment composition so that it is spread generally around the entire circumference of the pipe interior and so that the treatment composition stays in place upon the pipeline walls, without being scraped or otherwise readily removed by the pig or body. The size of the spreader pig or body may be of a selected diameter or size so that in combination with the amount of treatment composition introduced into the pipeline, the treatment composition may be applied at a selected thickness along the length of the pipe segment 12.

In certain embodiments, a single pig or body 22 may be used to both apply the treatment composition as well as remove deposits or materials from the surfaces of the pipeline simultaneously. In such instances, the pig or body 22 may have downstream features or portions configured to facilitate applying the treatment composition and upstream features or portions configured for removing deposits or materials from the surfaces of the pipeline.

In other embodiments of the treatment, at least one pig or body 22 is a cleaner or scraper pig that is used for removing deposits or materials from the surfaces of the pipeline after a first pig is used to apply the treatment composition. In some applications, scraper pigs or bodies 22 of different sizes or diameters may be used that are successively introduced into the pipeline, from smaller to larger, so that deposits are removed progressively as the size of the pig increases.

One or more final drying pigs may also be used in certain embodiments to facilitate drying the pipeline after the cleaning or scraping operation is carried out.

The launcher assembly 14 further includes a reducer portion 24 that tapers to a smaller minor barrel portion 26 upstream from a pig trap valve 28, which is coupled to a mainline 30 of the line segment 12. The trap valve 28 is used to selectively open and close off communication between the launcher assembly 14 and the mainline 30 of the pipeline segment 12 and allows the passage of the pig 22 from the minor barrel portion 26 to the mainline 30, which may be of the same or similar diameters.

A kicker line 32 fluidly couples the major barrel portion 18 to a bypass inlet line 34. The bypass inlet line 34 is used to introduce fluid flow from the upstream pipeline 10 into the mainline 30 of the pipeline segment 12. The kicker line 32 diverts fluid flow from the bypass line 34 to the barrel 18. The kicker line 32 may couple to the barrel 18 as far upstream as possible to facilitate launching of the pig or body 22. A trap bypass valve 36 of the kicker line 32 is used to control fluid flow from bypass line 34. A bypass valve 38 is also provided for selectively controlling fluid flow through bypass line 34 to mainline 30.

A balance line 40 is shown fluidly coupled to the kicker line 32 and the minor barrel portion 26 near the trap valve 28. The balance line 40 is used to balance the pressure on both sides of the pig 22 when it is located within the major barrel portion 18 to minimize or prevent movement of the pig 22 within the launcher assembly 14. A control valve 42 allows the balance line 40 to be selectively opened or closed.

Other valves and lines (not shown), such as for venting, purging, injecting, draining fluids, etc., may also be coupled to the launcher assembly 14 and its components to facilitate various functioning of the launcher assembly 14. For example, with both the trap valve 28 and trap bypass valve 38 closed, the barrel 18 may be vented to atmospheric pressure to allow the door 20 to be opened and allowing the pig 22 to be introduced and positioned within the launcher 14.

With the door 20 closed and the pig 22 located within the launcher 14, the trap bypass valve 36 and pig trap valve 28 can be opened and the bypass valve 38 and balance valve 42 can be closed. This causes fluid flow through the bypass line 34 to be directed through the kicker line 32 to the major barrel portion 18. The pig 22 is thereby forced out of the launch assembly 14 so that it is directed downstream down the mainline 30 of pipeline segment 12.

When the pig 22 passes the trap valve 28, the bypass valve 38 can be opened and the trap bypass valve 36 and pig trap valve 28 can be closed. Fluid flow from bypass line 34 through mainline 30 will continue to force the pig 22 downstream down the length of the line segment 12 to the receiver pig assembly 16.

The receiver assembly 16 is configured similarly to the launcher assembly 16. Like the launcher assembly 16, the receiver assembly includes a major barrel portion 44 and access door or closure 46 for selectively closing the end opening of the barrel portion 44. A tapered reducer portion 48 fluidly couples the major barrel portion 44 to a reduced diameter minor barrel portion 50 upstream from the major barrel portion 44. The minor barrel portion 50 is located downstream from a pig trap valve 52, which is coupled to the downstream end of the mainline portion 30 of the line segment 12. The trap valve 52 is used to selectively open and close off communication between the receiver assembly 16 and the mainline portion 30 of the pipeline segment 12 and allows the passage of the pig 22 from the mainline portion 30 to the minor barrel portion 50, which may be of the same or similar diameters.

A return line 54 fluidly couples the major barrel 44 to the bypass outlet line 56. The bypass outlet line 56 directs fluids downstream to the remainder of the pipeline 10. The return line 54 returns fluid flow from the barrel 44 to the bypass outlet line 56. The return line 54 typically couples to the barrel 44 at position near the reducer 48. A trap bypass valve 58 of the return line 54 is used to selectively return fluid flow from barrel 44 through the return line 54 to the bypass outlet line 56. A bypass valve 60 is also provided for controlling fluid flow through bypass line 34 from mainline 30.

A balance line 62 is shown fluidly coupled to the return line 54 and the minor barrel portion 50 near the trap valve 52. The balance line 62 is used to balance the pressure on both sides of the pig 22 when it is located within the major barrel portion 44 to minimize or prevent movement of the pig 22 within the receiver assembly 14. A control valve 64 allows the balance line 62 to be selectively opened or closed.

Other valves and lines (not shown), such as for venting, purging, injecting, draining fluids, etc., may also be coupled to the receiver assembly 16 to facilitate various functioning of the receiver assembly 16.

By opening trap valve 52 and trap bypass valve 58, the pig 22 can be received within the receiver assembly 16. The bypass valve 60 can be closed or partially closed to facilitate directing the pig 22 into the barrel portion 44. When the pig 22 is received within the major barrel portion 44 of the receiver assembly 16, the bypass valve 60 can be fully opened and the trap valve 52 and trap bypass valve 58 closed. The receiver assembly 16 can then be vented to atmospheric pressure and drained so that the access door 46 can be opened and the pig 22, along with any collected material or debris, can removed from the receiver assembly 16.

In this manner, treatments can be carried out without interrupting fluid flow through the pipeline. The pigs are passed through the pipeline utilizing the normal pipeline fluid flow and pressure. This is important on major pipelines where disruption in fluid flow (e.g., natural gas) can have significant negative consequences, such as natural gas used fuel to power plants, etc.

Figure 2:
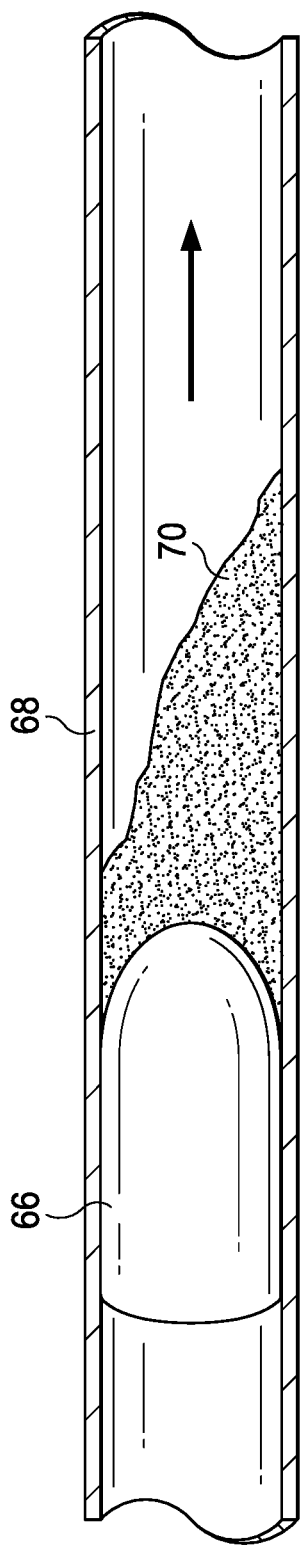
FIG. 2 is a schematic of a pipeline segment showing a single pig and pill of the treatment composition being passed through the pipeline segment.

FIG. 2. illustrates the movement of a spreader pig 66 down through the interior of pipeline segment 68 to be cleaned, which may the same or similar to the pipeline segment 12 of FIG. 1, previously described. The spreader pig 66 may be launched and received through launching and receiving assemblies, which may be the same or similar to those assemblies 14, 16 of FIG. 1 previously described. As shown in FIG. 2, a quantity of cleaning or treatment composition 70, which is described in more detail later on, in the form of a mass or "pill" is introduced into the pipeline segment 68 ahead of the pig 66. The pig 66 facilitates spreading composition upon surfaces of the interior of the pipeline segment 68 along all or a portion of the length of the segment 68.

Figure 3:
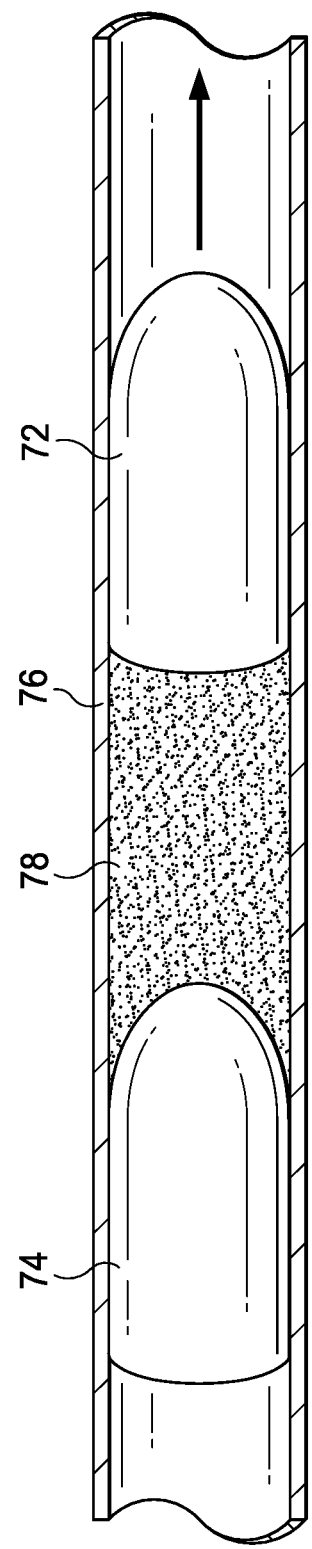
FIG. 3 is a schematic of a pipeline segment showing a dual pig and pill of the treatment composition being passed through the pipeline segment.

FIG. 3 shows another embodiment wherein two pigs 72, 74 are used in pipeline segment 76. Here, pig 72 constitutes a lead pig and pig 74 constitutes a trailing pig. In this embodiment, a mass or pill 78 of treatment composition is introduced between the pigs 72, 74. The pigs 72, 74 facilitate spreading the treatment composition upon surfaces of the interior of the pipeline segment 68 along all or a portion of the length of the segment 76.

The amount of treatment composition used may be selected to provide a desired thickness applied to the walls of a pipeline segment along all or a portion of the length of the pipeline segment. This may be determined by the formula of Equation 1 below:

$$V = \pi \cdot [(R^2 - (R-T)^2] \cdot L \tag{1}$$

where V is the total volume of treatment composition used, R is the internal radius of the pipe being treated, T is the desired thickness of the treatment composition to be applied to the walls of the pipe, and L is the length of the pipe being treated.

The treatment composition used for cleaning pipelines in accordance with the invention incorporates a colloidal particle dispersion having inorganic nanoparticles. In many cases the inorganic nanoparticles are silica nanoparticles, although other non-silica inorganic nanoparticles can be used alone or with silica nanoparticles. Colloidal silica dispersions using silica nanoparticles have been around for some time. They are typically formed from silica particles that are dispersed in a liquid phase. The liquid phase may be an aqueous or non-aqueous liquid or a combination of such liquids. The nanoparticles are stabilized electrostatically in the liquid so that they tend to stay suspended within the liquid. Non-limiting examples of various colloidal particle dispersions are those described in U.S. Pat. Nos. 7,544,726 and 7,553,888 and U.S. Pat. App. Pub. Nos. US2016/0017204; US2018/0291255; US2018/0291261; US2019/0078015; US2019/0078015; US2019/0136123; US2019/0225871, each of which is incorporated herein by reference for all purposes, including the colloidal particle dispersions and compositions disclosed therein and the methods of making the same. Such colloidal particle dispersions are commercially available. Examples of suitable commercially available colloidal particle dispersions include, but are not limited to, those available from Nissan Chemical America Corporation as nanoActive®, nanoActive® HRT, nanoActive® EFT, and nanoActive® HNP solutions.

The inorganic nanoparticles of the colloidal particle dispersion will typically have particle size to facilitate formation of the colloidal particle dispersion so that the suspension remains stable. In many instances the inorganic nanoparticles will have an average particle size of from 500 nm or less. More often they will have an average particle size of from 300 nm or less, and still more particularly from 200 nm or less. In some embodiments, the inorganic nanoparticles will have an average particle size of from 0.1 nm to 500 nm, more particularly from 0.1 nm, 1 nm, 2 nm, 3 nm, 4 nm, or 5 nm to 30 nm, 40 nm, 50 nm, 100 nm, 200 nm, or 300 nm. In certain applications the inorganic nanoparticles may have an average particle size of from at least, equal to, and/or between any two of 0.1 nm, 0.2 nm, 0.3 nm, 0.4 nm, 0.5 nm, 0.6 nm, 0.7 nm, 0.8 nm, 0.9 nm, 1 nm, 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 29 nm, 30 nm, 31 nm, 32 nm, 33 nm, 34 nm, 35 nm, 36 nm, 37 nm, 38 nm, 39 nm, 40 nm, 41 nm, 42 nm, 43 nm, 44 nm, 45 nm, 46 nm, 47 nm, 48 nm, 49 nm, 50 nm, 51 nm, 52 nm, 53 nm, 54 nm, 55 nm, 56 nm, 57 nm, 58 nm, 59 nm, 60 nm, 61 nm, 62 nm, 63 nm, 64 nm, 65 nm, 66 nm, 67 nm, 68 nm, 69 nm, 70 nm, 71 nm, 72 nm, 73 nm, 74 nm, 75 nm, 76 nm, 77 nm, 78 nm, 79 nm, 80 nm, 81 nm, 82 nm, 83 nm, 84 nm, 85 nm, 86 nm, 87 nm, 88 nm, 89 nm, 90 nm, 91 nm, 92 nm, 93 nm, 94 nm, 95 nm, 96 nm, 97 nm, 98 nm, 99 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, and 500 nm.

It should be noted in the description, if a numerical value, concentration or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or referred to, it is to be understood that the inventor appreciates and understands that any and all points within the range are to be considered to have been specified, and that inventor possesses the entire range and all points within the range, including smaller ranges within the larger ranges.

The inorganic nanoparticles, which are typically silica nanoparticles, may be surface functionalized with hydrophilic monomers and/or a mixture of hydrophilic and hydrophobic monomers. Such surface treatment can make the nanoparticles more stable in high saline or other disruptive conditions. Such surface treatment may be achieved with the use of silane compounds. Organosilanes are particularly useful for such surface modification. The colloidal inorganic nanoparticles can be surface modified by the reaction of colloidal silica surfaces with at least one moiety selected from the group consisting of a monomeric hydrophilic organosilane, a mixture of monomeric hydrophilic and monomeric hydrophobic organosilanes, or a polysiloxane oligomer.

Suitable monomeric hydrophilic organosilanes include, but are not limited to, glycidoxypropyl trimethoxysilane, glycidoxypropyl triethoxysilane, glycidoxypropyl tributoxysilane, glycidoxypropyl trichlorosilane, phenyl trimethoxysilane, phenyl trimethoxysilane, phenyl trichlorosilane, and combinations of these.

Suitable monomeric hydrophobic organosilanes include, but are not limited to, trimethoxy[2-(7-oxabicyclo[4.1.0]hept-3-yl)ethyl]silane, triethoxy[2-(7-oxabicyclo[4.1.0]hept-3-yl)ethyl]silane, trichloro[2-(7-oxabicyclo[4.1.0]hept-3-yl)ethyl]silane, methacryloxypropyl trimethoxysilane, methacryloxypropyl triethoxysilane, methacryloxypropyl trichlorosilane, vinyltrimethoxysilane, vinyltriethoxysilane, vinyltrichlorosilane, isobutyltrimethoxysilane, isobutyltriethoxysilane, isobutyltrichlorosilane, hexamethyldisiloxane, hexamethyldisilazane. and combinations of these.

Suitable polysiloxane oligomers may include, but are not limited to, glycidoxypropyltrimethoxysilane, methacryloxypropyltrimethoxysilane, isobutyltrimethoxysilane, vinyltrimethoxysilane, trimethoxy[2-(7-oxabicyclo[4.1.0]hept-3-yl)ethyltrimethoxysilane, and hexamethyldisiloxane, and combinations of these.

In some instances, the inorganic nanoparticles may be encapsulated in a surfactant. Such encapsulation and surfactants are described, for instance, in U.S. Pat. App. Pub. No. US2016/0017204.

In the treatment composition, the amount of nanoparticles in the treatment composition may range from 60 wt %, 50 wt %, 40 wt %, 30 wt % or less by total weight of the treatment composition. In certain instances, the amount of particles will range from 0.001 wt %, 0.01 wt %%, 0.1 wt %, 1 wt %, 2 wt %, 3 wt %, 4 wt %, and 5 wt % to 10 wt %, 15 wt % to 30 wt %, 35 wt %, 40 wt %, 45 wt %, 50 wt %, and 60 wt % by total weight of the colloidal particle dispersion. In certain applications the inorganic nanoparticles may make up from at least, equal to, and/or between any two of 0.001 wt %, 0.002 wt %, 0.003 wt %, 0.004 wt %, 0.005 wt %, 0.006 wt %, 0.007 wt %, 0.008 wt %, 0.009 wt %, 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, 5.5 wt %, 6.0 wt %, 6.5 wt %, 7.5 wt %, 8.0 wt %, 8.5 wt %, 9.0 wt %, 9.5 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, and 60 wt % by total weight of the colloidal particle dispersion.

The treatment composition further includes a solvent. This may be the solvent that the inorganic nanoparticles, which may be surface-functionalized nanoparticles, of the colloidal dispersion are initially dispersed in. The solvent may comprise water or aqueous liquids and/or non-aqueous liquids. In some embodiments, the solvent is an aqueous solvent that includes a mixture of water and alcohols. The alcohol solvent may be a $C_1$ to $C_6$ alcohol, such as methanol, ethanol, isopropyl alcohol, etc. The proportion of water to alcohol may range from 100:1 to 1:100 by weight. Organic solvents may also be used alone or in combination with water. Organic solvents may include alcohols, methyl ethyl ketone (MEK), methyl isobuyl ketone, toluene, xylene, cyclohexane, dimethyl acetamide, ethyl acetate, etc. Combinations of various solvents, aqueous and non-aqueous, may be used.

The solvents may be present in the treatment composition in an amount of from 50 wt % or less by total weight of the treatment composition. In particular embodiments, the solvent is present in the treatment composition in an amount of from at least, equal to, and/or between any two of 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, 5.5 wt %, 6.0 wt %, 6.5 wt %, 7.5 wt %, 8.0 wt %, 8.5 wt %, 9.0 wt %, 9.5 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, and 50 wt % by total weight of the treatment composition.

The treatment composition may also include a surfactant component. The surfactant may include an amphoteric surfactant, an ionic surfactant, an anionic surfactant, a cationic surfactant, a nonionic surfactant, or a combination of these. In particular embodiments, the surfactant is primarily an anionic surfactant with or without the use of a minor portion of non-ionic surfactants. Examples of suitable surfactants include, but are not limited to, ethoxylated nonyl phenol, sodium stearate, sodium dodecyl sulfate, sodium dodecylbenzene sulfonate, alkyl olefin sulfonates, laurylamine hydrochloride, trimethyldodecylammonium chloride, cetyl trimethylammonium chloride, polyethylene oxide alcohol, ethoxylated castor oil, propoxylated castor oil, ethoxylated-propoxylated castor oil, ethoxylated soybean oil, propoxylated soybean oil, ethoxylated-propoxylated soybean oil, ethylene oxide-propylene oxide copolymers, sodium trideceth sulfate, ethoxylated tetramethyl decyne alcohol, alkylphenolethoxylate, Polysorbate 80, ethoxylated or propoxylated polydimethylsiloxane, dodecyl betaine, lauramidopropyl betaine, cocamidopropyl betaine, cocamidopyropyl-2-hydroxypropyl sulfobetaine, alkyl aryl sulfonates, protein-surfactant complexes, fluorosurfactants, polyethyleneoxide alkyl ether phosphates, and combinations of these. In certain embodiments, the surfactant may be an ethylene oxide/propylene oxide copolymer, such as that available from AksoNobel as ETHYLAN 1206. An alkyl olefin sulfanate may also be used as the surfactant, such as that commercially available from Pilot Chemical as Calsoft® AOS-40. A suitable commercially available amphoteric surfactant is that available from Solvay as Mackam® CBS-50G.

The surfactants may be present in the treatment composition in an amount of from 0.01 wt % to 50 wt % by total weight of the treatment composition, more particularly from 0.1 wt % to 10 wt %, and still more particularly from 0.5 wt % to 5 wt %. In certain embodiments, the surfactants may be present in the treatment composition in an amount of at least, equal to, and/or between any two of 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, 5.5 wt %, 6.0 wt %, 6.5 wt %, 7.5 wt %, 8.0 wt %, 8.5 wt %, 9.0 wt %, 9.5 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, and 50 wt % by total weight of the treatment composition.

The treatment composition further include glycols. The glycols may act as solvent as well as act as a drying agent. Examples of such materials include, but are not limited to, ethylene glycol, propylene glycol, triethylene glycol, ethylene glycol mono n-propyl ether, propylene glycol methyl ether acetate, etc., and combinations of these. In many applications, the glycols will be ethylene glycol and triethylene glycol.

The glycols may be present in the treatment composition in an amount of from 50 wt % or less by total weight of the treatment composition. In particular embodiments, the glycols may be present in the treatment composition of from 0.1 wt % to 50 wt %. In certain embodiments, the glycols may be present in the treatment composition in an amount of at least, equal to, and/or between any two of 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, 5.5 wt %, 6.0 wt %, 6.5 wt %, 7.5 wt %, 8.0 wt %, 8.5 wt %, 9.0 wt %, 9.5 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, and 50 wt % by total weight of the treatment composition.

The treatment composition may also include a terpene and/or a terpenoid. Terpenes are organic compounds that are typically derived biosynthetically from units of isoprene, which has the molecular formula $C_5H_8$. The basic molecular formula of terpenes are multiples of this (i.e., $(C_5H_8)_n$ where n is the number of linked isoprene units). The isoprene units may be linked together "head to tail" to form linear chains or they may be arranged to form rings. Terpenoids are like terpenes but typically contain additional functional groups, such as oxygen or OH groups. One common example of a terpene compound is limonene. Limonene is a cyclic terpene. The d-isomer version of limonene is d-limonene, which is commonly available. Less common is the l-isomer, i.e., l-limonene. These and other terpene and terpenoid compounds are commercially available.

The terpene and/or terpenoid compounds may be present in the treatment composition in an amount of from 50 wt % or less by total weight of the treatment composition. In particular embodiments, the terpene and/or terpenoid compounds may be present in the treatment composition in an amount of from 0 wt % to 50 wt %. In certain embodiments, the terpene and/or terpenoid compounds may be present in the treatment composition in an amount of at least, equal to, and/or between any two of 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, 5.5 wt %, 6.0 wt %, 6.5 wt %, 7.5 wt %, 8.0 wt %, 8.5 wt %, 9.0 wt %, 9.5 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, and 50 wt % by total weight of the treatment composition.

In certain embodiments, the treatment composition includes a non-terpene oil. An example of a suitable non-terpene oil is methyl soyate. Methly soyate is a methyl ether derived from soybeans and methanol. The non-terpene oil may be present in the treatment composition in an amount of from 50 wt % or less by total weight of the treatment composition. the non-terpene oil may be present in the treatment composition in an amount of from 0 wt % to 50 wt %. In certain embodiments, the non-terpene oil may be present in the treatment composition in an amount of at least, equal to, and/or between any two of 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %, 5.5 wt %, 6.0 wt %, 6.5 wt %, 7.5 wt %, 8.0 wt %, 8.5 wt %, 9.0 wt %, 9.5 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, and 50 wt % by total weight of the treatment composition.

The treatment composition may further include a bio- or bacteria-reducing agent and/or biocide. A "biocide" is a technical definition that is defined by the EPA. In some instances, a bio-reducing or bacteria-reducing agent that does not meet the EPA definition of a biocide may be used. The difference may be the result of the concentrations and/or materials used. One non-limiting example of a suitable bacteria-reducing agent is glutaraldehyde. The bio- or bacteria-reducing agent and/or biocide may be used in an amount of from 0.01 wt % to 5 wt % by total weight of the treatment composition. In particular applications, the amount of bio- or bacteria-reducing agent and/or biocide may be at least, equal to, and/or between any two of 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, and 5.0 wt % by total weight of the treatment composition.

A pH adjusting agent may also be used in the treatment composition. These may be acidic or alkali materials used to lower or raise the pH of the treatment composition to a selected level. The pH of the treatment composition may vary (e.g., a pH from 6 to 8) depending upon the composition makeup, the treatment to be performed and the purpose or fluids transported through the pipeline. In certain applications, the pH of the treatment composition will range from 6 to 7.

In certain embodiments the treatment composition may be free of or contain less than 0.1 wt %, 0.01 wt %, or 0.001 wt % of any one or more of an iron chelator, tetrakis(hydroxymethyl)phosphonium chloride (THPC), tetrakis(hydroxymethyl)phosphonium sulfate (THPS), methanol, and/or ethanol. In the case of methanol, this may be avoided in those cleaning treatments used to clean pipelines for natural gas as it may mask the odors of mercaptans, which are used as odorants in natural gas to facilitate gas-leak detection.

In carrying out the treatment method for cleaning a pipeline, the treatment composition as has been described is introduced into an interior of a pipeline to be cleaned. Referring to FIG. 1, this will typically be at the upstream end of the pipeline segment 12, at or within the barrel portions 18, 20 of the pig launcher 14. The treatment composition may be introduced into the launcher through a port and valve formed for such purpose, or may be introduced into the opening of the barrel portion 18. The treatment composition may also be injected at one or more positions spaced apart along the length of the pipeline segment 12. Injection ports (not shown) may be provided along the length of the pipeline segment 12 for this purpose.

The pig 22, which represents a spreader pig for applying the treatment composition to the surfaces of the interior of the pipeline, is introduced into the launcher 14 and/or pipeline segment 12, with the treatment composition located downstream of the pig 22. The spreader pig 22 can then be launched down the pipeline segment 12 so that it spreads the treatment composition along the walls of the interior of the mainline pipe 30 of pipeline segment 12.

In particular embodiments, the volume amount of treatment composition used may be that selected to provide a particular thickness according to Equation 1. The thickness of the treatment composition may vary. In many applications the thickness of the treatment composition applied to the walls of the treated pipe may range from 0.1 mil or 10 mils or more. In particular embodiments, the treatment composition is applied to the walls of the treated pipe at a thickness at least, equal to, and/or between any two of 0.1 mil, 0.2 mil, 0.3 mil, 0.4 mil, 0.5 mil, 0.6 mil, 0.7 mil, 0.8 mil, 0.9 mil, 1.0 mil, 1.1 mils, 1.2 mils, 1.3 mils, 1.4 mils, 1.5 mils, 1.6 mils, 1.7 mils, 1.8 mils, 1.9 mils, 2.0 mils, 2.1 mils, 2.2 mils, 2.3 mils, 2.4 mils, 2.5 mils, 2.6 mils, 2.7 mils, 2.8 mils, 2.9 mils, 3.0 mils, 3.1 mils, 3.2 mils, 3.3 mils, 3.4 mils, 3.5 mils, 3.6 mils, 3.7 mils, 3.8 mils, 3.9 mils, 4.0 mils, 4.1 mils, 4.2 mils, 4.3 mils, 4.4 mils, 4.5 mils, 4.6 mils, 4.7 mils, 4.8 mils, 4.9 mils, 5.0 mils, 5.1 mils, 5.2 mils, 5.3 mils, 5.4 mils, 5.5 mils, 5.6 mils, 5.7 mils, 5.8 mils, 5.9 mils, 6.0 mils, 6.1 mils, 6.2 mils, 6.3 mils, 6.4 mils, 6.5 mils, 6.6 mils, 6.7 mils, 6.8 mils, 6.9 mils, 7.0 mils, 7.1 mils, 7.2 mils, 7.3 mils, 7.4 mils, 7.5 mils, 7.6 mils, 7.7 mils, 7.8 mils, 7.9 mils, 8.0 mils, 8.1 mils, 8.2 mils, 8.3 mils, 8.4 mils, 8.5 mils, 8.6 mils, 8.7 mils, 8.8 mils, 8.9 mils, 9.0 mils, 9.1 mils, 9.2 mils, 9.3 mils, 9.4 mils, 9.5 mils, 9.6 mils, 9.7 mils, 9.8 mils, 9.9 mils, and 10 mils.

As shown in FIG. 2, the treatment composition may be applied as a pill 70 before a single spreader pig 66. Alternatively, the treatment composition may be applied as a pill 78 between leading and trailing pigs 72, 74, as shown in FIG. 3. The passage of the pigs through the pipeline may result in both the application of treatment composition and removal of previously deposited materials simultaneously in certain instances.

In some embodiments, a single pig is used to both apply the treatment composition as well as remove the composition and materials adhering to the surfaces of the interior of the pipeline to facilitate cleaning of the pipeline. In such situations, the treatment composition may only reside on the surfaces of the pipeline for a brief duration of a few seconds to even a fraction of a second depending upon the speed of the pig. This may sometimes be referred to as a "flush and brush" application, wherein the same pig is used to both apply or spread the treatment composition while also simultaneously removing materials as the pig body is passed through the pipeline.

In other embodiments, the treatment composition is applied to the walls of the pipeline with one pig or body that does not facilitate the removal of the applied treatment composition and those materials adhering to the walls of the pipeline. In such instances, the applied treatment composition is allowed to reside upon the surfaces of the interior of the pipeline for a period of time after it is applied without further passing a second cleaning or scraper pig through the pipeline. This may sometimes be referred to as a "soak and brush" application. The residence time that the treatment composition is allowed to reside on the walls of the pipeline after its application may range from 10 minutes or more. The residence time may vary depending upon the cleaning job to be performed. In many instances, the residence time may range from 10 minutes to several days, more particularly from 1 hr to 48 hrs, and still more particularly from 3 hrs to 24 hours. In particular embodiments, the treatment composition is allowed to reside on the walls of the pipeline from at least, equal to, and/or between any two of 10 min, 20 min, 30 min, 40 min, 50 min, 1 hr, 2 hrs, 3 hrs, 4 hrs, 5 hrs, 6 hrs, 7 hrs, 8 hrs, 9 hrs, 10 hrs, 11 hrs, 12 hrs, 13 hrs, 14 hrs, 15 hrs, 16 hrs, 17 hrs, 18 hrs, 19 hrs, 20 hrs, 21 hrs, 22 hrs, 23 hrs, 24 hrs, 25 hrs, 26 hrs, 27 hrs, 28 hrs, 29 hrs, 30 hrs, 31 hrs, 32 hrs, 33 hrs, 34 hrs, 35 hrs, 36 hrs, 37 hrs, 38 hrs, 39 hrs, 40 hrs, 41 hrs, 42 hrs, 43 hrs, 44 hrs, 45 hrs, 46 hrs, 47 hrs, and 48 hrs.

The treatment composition incorporating the inorganic nanoparticles provides a cleaning fluid that works to penetrate deposits on the interior surface of the pipeline by a Brownian-motion, diffusion-driven mechanism known as disjoining pressure. Moreover, depending upon the treatment composition makeup, the nanoparticles themselves may be charged. For example, the colloidal particle dispersion may be an anionic or a cationic colloidal silica dispersion. This may result in the nanoparticles being attracted to the material of the pipeline, such as pipelines that are provided with cathodic corrosion protection. This attraction, as well as the Brownian-motion, causes the nanoparticle materials to penetrate the deposits on the walls of the pipe to facilitate loosening and breaking up of the deposits that are formed on the interior surfaces of the pipeline.

After the selected residence time is reached, a cleaning or scraper pig may be passed through the pipeline to remove the treatment composition and those materials adhering to the surfaces of the interior of the pipeline. One or more cleaning or scraper pigs may be used for this purpose.

In certain instances, the process is repeated wherein the same or a different treatment composition is applied to the interior surfaces of the pipeline, followed by scraping or cleaning with the same or a different pig. For example, in a single pipeline segment, the treatment composition application/scraping cycle may be performed from 1 to 20 times or more. Different size pigs may be used for subsequent treatment/cleaning cycles. The amount of treatment composition applied during each cycle may be the same or vary from cycle to cycle.

One of the advantages of the treatment composition and method is that it dries water or moisture from the pipeline. While there can be some water used in the treatment composition, this water is not free water that will elevate the moisture content within the pipeline. This is because the water complexes with the other components (e.g., glycols) of the treatment composition. The drying agents further aid to absorb existing liquid water and vapor in the pipeline so that the treatment facilitates drying of the pipeline. As a result, in certain instances, a drying pig may not be necessary after the treatment has been carried out. In other applications, a drying pig may be passed through the pipeline to remove any residual water moisture or liquids.

In some applications, a corrosion inhibitor may be applied to the interior surfaces of the pipeline after the treatment composition and materials adhering to the surfaces of the interior of the pipeline are removed. Those corrosion inhibitors and application methods that are well known in the art may be used.

The treatment composition can also be used in treating and maintaining pipelines apart from those pigging operations, previously described. In such treatment operations, the treatment composition is introduced into the pipeline without the use of a pig or body that is passed through the pipeline to apply or spread the treatment composition to the interior surfaces of the pipeline. Instead, the introduced treatment composition is carried by the fluids flowing through the pipeline, such as high velocity gases (e.g., natural gas), that carry the treatment fluid along the length of the pipeline segment being treated. In such instances, the treatment composition may tend to adhere to the interior surfaces of the pipeline as a thin layer or film even without the use of a pig or body to spread the treatment composition. This may be due, at least in part, because of the colloidal silica dispersion being ionically charged in certain applications. When the pipeline is provided with cathodic corrosion protection, this attracts the ionically charged colloidal silica dispersion of the treatment composition. The treatment composition can be tailored with a colloidal silica dispersion having appropriately charged nanoparticles that are attracted to the pipeline walls based upon the type of cathodic corrosion protection used for the pipeline.

Figure 4:
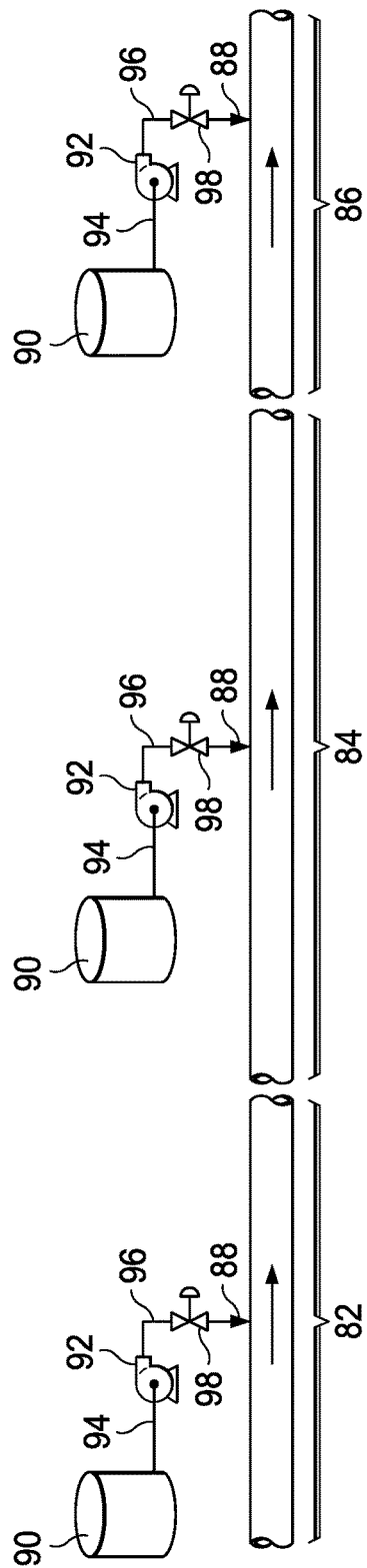
FIG. 4 is a schematic of various pipeline segments showing injection points for the injecting treatment either as a batch amount or continuously over time in accordance with particular embodiments of the invention.

FIG. 4 shows a pipeline 80, such as those previously described, that can be treated in either a batch or bulk treatment operation and/or a continuous operation. The pipeline 80 to be treated may be divided along its length into different pipeline segments 82, 84, 86 of selected lengths. Each segment 82, 84, 86 is provided with at least one treatment composition injection point 88 at or near the upstream end of each segment where the treatment composition can be introduced into the interior of the pipeline 80. Such injection points can be any device or apparatus provided on the pipeline for introducing materials into the interior of the pipeline from the exterior of the pipeline. This may include, but is not limited to, an olet-type fitting (e.g., weldolet, etc.) provided on the pipeline wall. Such injection points are typically located at surface locations so that they can be readily accessed.

The injection point 88 where the treatment composition is injected for each pipeline segment may be spaced from the next adjacent injection point (upstream or downstream) a distance of from 1 inch to 100 miles or more. In particular embodiments, the injection points 88 may be spaced from the next adjacent injection point a distance of from 50 yards or 100 yards to 100 miles, more particularly from 1 mile to 50 miles, and still more particularly from 5 miles to 20 miles. In particular embodiments, the injection point 88 may be used for treating a length of pipeline or be spaced apart along the length of the pipeline being treated a length or distance of from at least, equal to, and/or between any two of 1 inch, 1 foot, 1 yard, 50 yards, 100 yards, 1 mile, 2 miles, 3 miles, 4 miles, 5 miles, 6 miles, 7 miles, 8 miles, 9 miles, 10 miles, 11 miles, 12 miles, 13 miles, 14 miles, 15 miles, 16 miles, 17 miles, 18 miles, 19 miles, 20 miles, 21 miles, 22 miles, 23 miles, 24 miles, 25 miles, 26 miles, 27 miles, 28 miles, 29 miles, 30 miles, 31 miles, 32 miles, 33 miles, 34 miles, 35 miles, 36 miles, 37 miles, 38 miles, 39 miles, 40 miles, 41 miles, 42 miles, 43 miles, 44 miles, 45 miles, 46 miles, 47 miles, 48 miles 49, 50 miles, 60 miles, 70 miles, 80 miles, 90 miles, and 100 miles.

At each injection point 88, a supply of the treatment composition is provided. This may be treatment composition stored in a storage vessel 90, which may be a stationary storage tank that is located nearby the injection point. The storage vessel 90 may also be a temporary or mobile storage tank mounted on a truck or other vehicle, such as on a truck bed or trailer, which can be transported to the injection point during treatment operations and removed thereafter. In certain embodiments, a separate storage tank 90 may be provided for each injection point.

One or more pumps 92, which may be high pressure pumps, are used to deliver the treatment composition to the injection point 88 through lines or hoses 94, 96. These may be stationary pumps that are permanently associated with and located nearby each stationary storage tank 90 or may be provided on or with the truck or vehicle in those cases where the storage tank is a mobile storage tank. The pumps 92 may be those pumps powered by electricity, solar, wind, gasoline, diesel, natural gas, etc.

One or more valves 98 are provided to control the flow of treatment composition from the storage tank 90 to the injection point 88. The valve or valves 98 may ball valves or other suitable valves, which may include one or more metering valves to control the rate of flow of the treatment composition to the injection point. A control unit (not shown) to control the operation and actuation of the pump 92 and/or valves 98 may be programed or be locally or remotely operated to provide the desired flow of treatment composition to the injection point.

Figure 5:
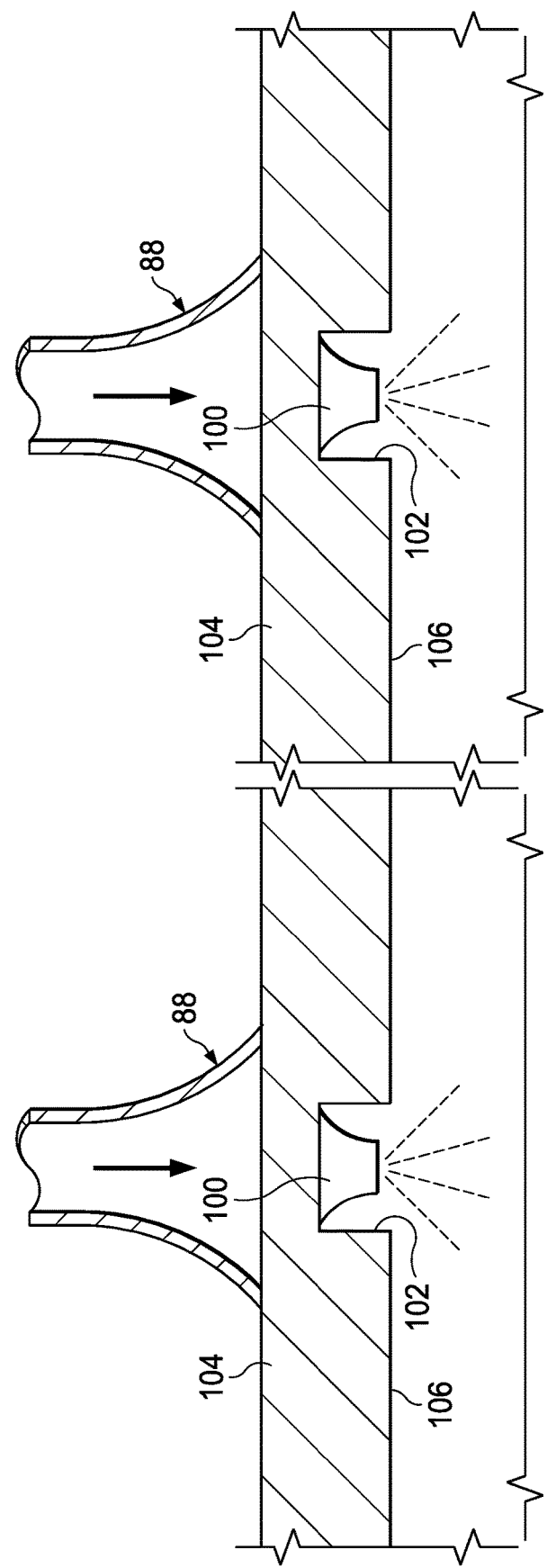
FIG. 5 is cross-sectional view of a pipeline wall showing spray nozzles recessed within the wall of the pipeline for introducing atomized treatment composition into the interior of the pipeline.

Referring to FIG. 5, in introducing the treatment composition at the injection point 88, one or more injection nozzles 100 may be provided at each injection point 88. The nozzles 100 may be configured to provide an atomized spray or a selected spray configuration within the interior of the pipeline. This may be an atomized spray in some applications. In other embodiments, the treatment composition may be injected at the injection point 88 without any spray nozzle or nozzles.

In cases were nozzles 100 are used, these may be recessed from the interior surfaces of the pipeline. As shown in FIG. 5, a recessed area 102 is provided in the pipeline wall 104 so that the tip or end of the nozzle 100 does not project past or is just flush with the interior surface 106 of the pipeline wall 104. This prevents the nozzles 100 from interfering with any pigs or bodies that are passed through the interior of the pipeline, such as during cleaning operations, as has been previously described.

In one treatment method, the treatment composition is introduced in a batch operation wherein a bulk amount of the treatment composition in a selected volume is introduced all at one time into the interior of the pipeline at each of the injection points 88. If there are long periods between batch treatments, it may not be practical to have a dedicated stationary storage tank for supplying the treatment composition to the injection points. In the bulk or batch treatments, the storage vessels 90 may therefore be provided on mobile storage vessels that are mounted on trucks or trailers or other vehicles that can be transported to the injection point locations located along the pipeline.

In the bulk or batch treatment, the desired volume of treatment composition is rapidly injected through the injection points. The lines, pumps, valves, etc., may be configured for the rapid introduction of the treatment composition into the pipeline, including high pressure pumps and lines (e.g., 1-inch high-pressure hoses). In some operations, the treatment composition may be introduced sequentially in different batch operations at each of the spaced apart injection points 88. This may be sequentially upstream or downstream. In other instances, the batch treatments at each injection point 99 may be carried out simultaneously or within short time from one another along the length of the pipeline being treated.

When the treatment composition is introduced in bulk or in a batch operation, the bulk volume of treatment composition may be introduced into the pipeline as a pill or bolus, with all of the treatment fluid for treating the pipeline segment being delivered within the pipeline in short period of time. This may range from 1 min to 24 hrs, more particularly from 15 min to 12 hrs, and still more particularly from 30 min to 8 hrs. In certain embodiments, the pill or bolus of fluid in the bulk or batch operation may be introduced in at least, equal to, and/or between any two of 1 min, 5 min, 10 min, 20 min, 30 min, 40 min, 50 min, 1 hr, 2 hrs, 3 hrs, 4 hrs, 5 hrs, 6 hrs, 7 hrs, 8 hrs, 9 hrs, 10 hrs, 11 hrs, 12 hrs, 13 hrs, 14 hrs, 15 hrs, 16 hrs, 17 hrs, 18 hrs, 19 hrs, 20 hrs, 21 hrs, 22 hrs, 23 hrs, and 24 hrs. Such bulk or batch treatments may be repeated or carried out periodically, such as once a day, once every few days (e.g., from 2 to 7 days), once a week, once every few weeks, once a month, once every few months (e.g., from 2 to 12 months), once a year, once every two years or longer, etc.

The amount of treatment composition introduced into each injection point for a given segment of pipeline during the batch or bulk treatment operation may be introduced in a selected bulk treatment volume $V_t$ according to Equation 2 below:

$$V_t = \pi \cdot [(R^2 - (R-T)^2] \cdot L \tag{2}$$

where R is the internal radius of the pipe being treated, T is from 0.1 mil to 10 mils, and L is the length of the pipeline segment being treated.

This volume $V_t$ generally corresponds to or is equivalent to the volume of treatment composition that would theoretically be applied to the walls of the treated pipe segment in a uniform layer along the length of the pipe segment. In certain embodiments, the value of T in Equation 2 may range from 0.1 mil to 10 mils or more. In particular applications, the value T may be at least, equal to, and/or between any two of 0.1 mil, 0.2 mil, 0.3 mil, 0.4 mil, 0.5 mil, 0.6 mil, 0.7 mil, 0.8 mil, 0.9 mil, 1.0 mil, 1.1 mils, 1.2 mils, 1.3 mils, 1.4 mils, 1.5 mils, 1.6 mils, 1.7 mils, 1.8 mils, 1.9 mils, 2.0 mils, 2.1 mils, 2.2 mils, 2.3 mils, 2.4 mils, 2.5 mils, 2.6 mils, 2.7 mils, 2.8 mils, 2.9 mils, 3.0 mils, 3.1 mils, 3.2 mils, 3.3 mils, 3.4 mils, 3.5 mils, 3.6 mils, 3.7 mils, 3.8 mils, 3.9 mils, 4.0 mils, 4.1 mils, 4.2 mils, 4.3 mils, 4.4 mils, 4.5 mils, 4.6 mils, 4.7 mils, 4.8 mils, 4.9 mils, 5.0 mils, 5.1 mils, 5.2 mils, 5.3 mils, 5.4 mils, 5.5 mils, 5.6 mils, 5.7 mils, 5.8 mils, 5.9 mils, 6.0 mils, 6.1 mils, 6.2 mils, 6.3 mils, 6.4 mils, 6.5 mils, 6.6 mils, 6.7 mils, 6.8 mils, 6.9 mils, 7.0 mils, 7.1 mils, 7.2 mils, 7.3 mils, 7.4 mils, 7.5 mils, 7.6 mils, 7.7 mils, 7.8 mils, 7.9 mils, 8.0 mils, 8.1 mils, 8.2 mils, 8.3 mils, 8.4 mils, 8.5 mils, 8.6 mils, 8.7 mils, 8.8 mils, 8.9 mils, 9.0 mils, 9.1 mils, 9.2 mils, 9.3 mils, 9.4 mils, 9.5 mils, 9.6 mils, 9.7 mils, 9.8 mils, 9.9 mils, and 10 mils.

The treatment composition itself for the batch or bulk pipeline treatment operation may be the same or similar to those treatment compositions used in conjunction with pigging operations, previously described. Such treatment composition is that containing the colloidal particle dispersion, which may be ionic dispersions, having inorganic nanoparticles with an average particle size of from 500 nm or less, along with any additives, which have been described previously in conjunction with the pigging operations.

The introduced treatment composition incorporating the inorganic nanoparticles helps to penetrate deposits on the interior surface of the pipeline by Brownian-motion, diffusion-driven mechanism. The colloidal silica dispersion may be ionic to facilitate adherence to the pipeline walls and penetration of deposits. When such charged nanoparticles of the ionic dispersion are used in pipelines that are provided with cathodic corrosion protection, they are attracted to the walls of the pipeline. This, as well as the Brownian-motion, causes the nanoparticle materials to penetrate the deposits on the walls of the pipe to facilitate loosening and breaking up of the deposits that are formed on the interior surfaces of the pipeline.

At the end of the bulk or batch treatment and prior to repeating a further bulk treatment, one or more pigging operations may be performed, with or without the introduction of additional treatment composition. This may be done to remove the treatment composition and those materials within and adhering to the surfaces of the interior of the pipeline. One of the advantages of using the batch or bulk treatment operation is that when a cleaning operation employing a pig is later performed after a batch treatment, less treatment composition may need to be used during the pigging operation. Thus, for example, without the batch treatment operation, when a pig cleaning operation is performed, the treatment composition may be applied at a thickness of 5 mils. When the batch treatment is utilized prior to any subsequent pig cleaning operation, the treatment composition may be applied at a thickness of only 1 mil during the subsequent pig cleaning to provide the same results or to remove the same amount of materials from the pipeline.

In other applications, the treatment composition can also be used in treating and maintaining pipelines by continuously introducing the treatment composition at a selected rate into the interior of the interior of the pipeline. In such operations, the treatment composition is introduced into the pipeline without the use of a pig or body that is passed through the pipeline to apply the treatment composition to the interior surfaces of the pipeline.

In such continuous treatment operation, the same or a similar configuration of the pipeline 80 shown in FIG. 4, as previously described for the batch operation, may be used. In the continuous operation, the storage tanks or vessels 90 may be stationary vessels since the treatment fluid is introduced continuously over time. The spacing of the injection points may also be the same. The pumps 92 and/or valves 98, which may be metering valves, are used to introduce the treatment composition at a given rate.

As used herein, the term "continuous" or similar designations with respect to the continuous treatment operation is meant to encompass the continuous, uninterrupted fluid flow where the fluid flows continuously without interruption or stopped. The continuous, uninterrupted fluid flow may be at a constant or a variable flow rate. The term "continuous" or similar designations in reference to continuous treatment operation, unless expressly stated otherwise, is also meant to encompass the fluid flow that may be temporarily interrupted or stopped for a period of time, but that provides an overall fluid flow at a selected rate over time. Thus, for example, the pump 92 may be operated and/or valve 98 may be actuated to periodically introduce a slug or flow of fluid of a selected volume every 5 minutes, with 12 slugs of fluid being introduced every hour. This will provide a desired amount or volume of treatment fluid being delivered and introduced into the interior of the pipeline every hour so that, while not technically continuous, uninterrupted flow, the treatment fluid is still provided at the desired rate of flow over one hour so that it is essentially continuous.

In the continuous treatment operation, the treatment composition may be introduced at each of the injection points 88 simultaneously or substantially simultaneously or within a short time from one another, so that the entire pipeline is generally treated at the same time. In other embodiments, the continuous treatment operation may be carried out at each injection point sequentially upstream or downstream.

When continuously introducing the treatment composition, the treatment fluid may be introduced at a selected flow rate Q according to Equation 3 below.

$$Q = 1.389E\text{-}3 \cdot \pi \cdot [(R^2 - (R-T)^2] \cdot L/\text{hr} \qquad (3)$$

where R is the internal radius of the pipe being treated, T is from 0.05 mil to 10 mils, and L is the length of the pipeline segment being treated.

In certain embodiments, the value of T in Equation 3 may range from 0.05 mil to 10 mils or more. The value of T is the thickness that would theoretically be applied to the walls of the treated pipe segment in a uniform layer along the length of the pipe segment if it was introduced and applied all at one time. In particular applications, the value T may be at least, equal to, and/or between any two of 0.05 mils, 0.06 mils, 0.07 mils, 0.08 mils, 0.09 mils, 0.1 mil, 0.2 mil, 0.3 mil, 0.4 mil, 0.5 mil, 0.6 mil, 0.7 mil, 0.8 mil, 0.9 mil, 1.0 mil, 1.1 mils, 1.2 mils, 1.3 mils, 1.4 mils, 1.5 mils, 1.6 mils, 1.7 mils, 1.8 mils, 1.9 mils, 2.0 mils, 2.1 mils, 2.2 mils, 2.3 mils, 2.4 mils, 2.5 mils, 2.6 mils, 2.7 mils, 2.8 mils, 2.9 mils, 3.0 mils, 3.1 mils, 3.2 mils, 3.3 mils, 3.4 mils, 3.5 mils, 3.6 mils, 3.7 mils, 3.8 mils, 3.9 mils, 4.0 mils, 4.1 mils, 4.2 mils, 4.3 mils, 4.4 mils, 4.5 mils, 4.6 mils, 4.7 mils, 4.8 mils, 4.9 mils, 5.0 mils, 5.1 mils, 5.2 mils, 5.3 mils, 5.4 mils, 5.5 mils, 5.6 mils, 5.7 mils, 5.8 mils, 5.9 mils, 6.0 mils, 6.1 mils, 6.2 mils, 6.3 mils, 6.4 mils, 6.5 mils, 6.6 mils, 6.7 mils, 6.8 mils, 6.9 mils, 7.0 mils, 7.1 mils, 7.2 mils, 7.3 mils, 7.4 mils, 7.5 mils, 7.6 mils, 7.7 mils, 7.8 mils, 7.9 mils, 8.0 mils, 8.1 mils, 8.2 mils, 8.3 mils, 8.4 mils, 8.5 mils, 8.6 mils, 8.7 mils, 8.8 mils, 8.9 mils, 9.0 mils, 9.1 mils, 9.2 mils, 9.3 mils, 9.4 mils, 9.5 mils, 9.6 mils, 9.7 mils, 9.8 mils, 9.9 mils, and 10 mils.

During the continuous treatment operation, the treatment composition is continuously introduced at the selected rate Q over a period of from 1 hr to 1000 hrs or more, more particularly from 24 hours to 700 hours. In particular embodiments, the treatment composition is continuously introduced over a period of at least, equal to, and/or between any two of 1 hr, 2 hrs, 3 hrs, 4 hrs, 5 hrs, 6 hrs, 7 hrs, 8 hrs, 9 hrs, 10 hrs, 11 hrs, 12 hrs, 13 hrs, 14 hrs, 15 hrs, 16 hrs, 17 hrs, 18 hrs, 19 hrs, 20 hrs, 21 hrs, 22 hrs, 23 hrs, 24 hrs, 24 hrs, 25 hrs, 26 hrs, 27 hrs, 28 hrs, 29 hrs, 30 hrs, 31 hrs, 32 hrs, 33 hrs, 34 hrs, 35 hrs, 36 hrs, 37 hrs, 38 hrs, 39 hrs, 40 hrs, 41 hrs, 42 hrs, 43 hrs, 44 hrs, 45 hrs, 46 hrs, 47 hrs, 48 hrs, 49 hrs, 50 hrs, 51 hrs, 52 hrs, 53 hrs, 54 hrs, 55 hrs, 56 hrs, 57 hrs, 58 hrs, 59 hrs, 60 hrs, 61 hrs, 62 hrs, 63 hrs, 64 hrs, 65 hrs, 66 hrs, 67 hrs, 68 hrs, 69 hrs, 70 hrs, 71 hrs, 72 hrs, 73 hrs, 74 hrs, 75 hrs, 76 hrs, 77 hrs, 78 hrs, 79 hrs, 80 hrs, 81 hrs, 82 hrs, 83 hrs, 84 hrs, 85 hrs, 86 hrs, 87 hrs, 88 hrs, 89 hrs, 90 hrs, 91 hrs, 92 hrs, 93 hrs, 94 hrs, 95 hrs, 96 hrs, 97 hrs, 98 hrs, 99 hrs, 100 hrs, 110 hrs, 120 hrs, 130 hrs, 140 hrs, 150 hrs, 160 hrs, 170 hrs, 180 hrs, 190 hrs, 200 hrs, 210 hrs, 230 hrs, 240 hrs, 250 hrs, 260 hrs, 270 hrs, 280 hrs, 290 hrs, 300 hrs, 310 hrs, 320 hrs, 330 hrs, 340 hrs, 350 hrs, 360 hrs, 370 hrs, 380 hrs, 390 hrs, 400 hrs, 410 hrs, 420 hrs, 430 hrs, 440 hrs, 450 hrs, 460 hrs, 470 hrs, 480 hrs, 490 hrs, 500 hrs, 510 hrs, 520 hrs, 530 hrs, 540 hrs, 550 hrs, 560 hrs, 570 hrs, 580 hrs, 590 hrs, 600 hrs, 610 hrs, 620 hrs, 630 hrs, 640 hrs, 650 hrs, 660 hrs, 670 hrs, 680 hrs, 690 hrs, 700 hrs, 710 hrs, 720 hrs, 730 hrs, 740 hrs, 750 hrs, 760 hrs, 770 hrs, 780 hrs, 790 hrs, 800 hrs, 810 hrs, 820 hrs, 830 hrs, 840 hrs, 850 hrs, 860 hrs, 870 hrs, 880 hrs, 890 hrs, 900 hrs, 910 hrs, 920 hrs, 930 hrs, 940 hrs, 950 hrs, 960 hrs, 970 hrs, 980 hrs, 990 hrs, and 1000 hrs.

The treatment composition used for the continuous treatment operation may be the same as that used for the pigging and batch operations, previously described, which can be considered a concentrated treatment composition. In most instances, however, the treatment composition used for the continuous treatment operation is diluted with water so that it is thinner or less viscous. Thus, for the treatment compositions previously described for use in conjunction with the pigging and batch treatment operations, these may be diluted with water in an amount of from 1 wt % to 99 wt % by weight of the concentrated treatment composition, more particularly the water may be added in an amount from 5 wt % to 90 wt % by weight of the concentrated treatment composition, and still more particularly the water may be added in an amount of from 25 wt % to 50 wt % by weight of the concentrated treatment composition. In particular applications, the treatment composition for the continuous treatment operation may be diluted with water in an amount of at least, equal to, and/or between any two of 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, and 99 wt % by weight of the concentrated treatment composition.

The less viscous treatment composition for the continuous treatment allows the treatment composition to be introduced through pumps and conduits, including high pressure pumps and lines (e.g., ⅜ to ½-inch high-pressure hoses) into the pipeline as an atomized liquid, such as through the atomizer nozzles 100 of FIG. 5. The addition of water also helps in delaying the drying time of the treatment composition within the interior of the pipeline. This helps in high-pressure, dry-gas pipelines where the gas has a very low dew point and is moving at a very high velocity. Without the additional water, the treatment composition can dry out before it reaches the end of the pipe segment being treated. The additional water also facilitates the wetting of the treatment composition on the interior walls of the pipeline so that there is sufficient moisture or liquid to allow the nanoparticles to act within the liquid layer to penetration of solid deposits on interior surfaces of a pipeline.

At the end of the continuous treatment operation, one or more pigging operations may be performed, with or without the introduction of additional treatment composition. This removes the treatment composition and those materials within and adhering to the surfaces of the interior of the pipeline. Like the batch treatment, one of the advantages of using the continuous treatment operation is that when a cleaning operation employing a pig is later performed after the continuous treatment, less treatment composition may need to be used during the pigging operation. Thus, for example, without the continuous treatment operation, when a pig cleaning operation is performed, the treatment composition may be applied at a thickness of 5 mils. When the continuous treatment is utilized prior to any subsequent pig cleaning operation, the treatment composition may be applied at a thickness of only 1 mil with the pig to provide the same results or to remove the same amount of materials from the pipeline.

One of the advantages of the continuous treatment operation, where the treatment composition is introduced over long periods of time at selected rates, is that the volume of liquid introduced into the pipeline can be controlled so that the liquid treatment composition does not overwhelm separation equipment (not shown) that may be associated with the pipeline. Separation equipment is often provided on gas pipelines in conjunction with compressor units (not shown) provided along the pipeline to pressurize the transported gas as it flows through the pipeline. The separation equipment separates the gases from any liquids in the pipeline before the gas is introduced into the compressor, where the liquids would otherwise damage the compressor. By reducing the flow of liquids in the continuous treatment operation so that they are introduced over time and not in a large bulk, the liquids do not exceed the capacity of the separation equipment and the separation equipment is not overwhelmed and can sufficiently separate the liquids of the treatment composition prior to delivering gas to the compressor.

The batch and continuous treatments can be each be carried out multiple times and in combination, wherein a batch treatment may be followed by a continuous treatment or vice versa. Alternating treatments may also be carried out. Furthermore, each treatment operation or multiple treatment operations may be followed with one or more pig cleaning operations, with or without further the use of treatment composition. In such cases, where the use of treatment composition is used in the pig cleaning operation, the same or a reduced amount of the treatment composition may be used had no previous batch or continuous treatment operation been performed.

The treatment methods and compositions in both the batch and continuous operations help in cleaning the pipeline, such as during subsequent pigging operations. Moreover, valves, filters, and other equipment commonly employed in pipelines often become fouled or clogged with particulates and other debris. The treating methods and compositions have shown the ability to reduce or eliminate this fouling and clogging. The treatments also aid in dehydrating or reducing the dew point in the pipeline. While there can be some water used in the treatment composition, this water is not free water that will elevate the moisture content within the pipeline. This is because the water complexes with the other components (e.g., glycols) of the treatment composition. The drying agent additives in the treatment composition further aid to absorb existing liquid water and vapor in the pipeline so that the treatment facilitates drying of the pipeline. The layer or film of the treatment composition on the interior walls of the pipeline conditions them, protecting them and preventing bacteria colony formation. Corrosion inhibitors in the treatment composition also help to prevent corrosion in the pipeline. The treatment composition also has no or very little effect on mercaptans or odorants that may be contained in the gases conducted through the pipeline so that there is no odorant fade as a result of the treatments.

The following examples serve to further illustrate various embodiments and applications.

EXAMPLES

Example 1

A cleaning treatment was performed on an existing 84-mile-long, 36-inch diameter dry gas line segment. This line was transferring 800 MMCF of dry gas per day. The treatment composition was comprised of a colloidal particle dispersion having silica nanoparticles with an average particle size of from 500 nm or less, a glycol, and glutaraldehyde. The pipeline was cleaned at night because of lower gas demands than during daylight hours. During the treatment operation, valves that were feeding customers from the pipeline were closed. As the pig and treatment composition travelled down the pipeline, these valves were opened after passage of the pig downstream.

Five different injection points for introducing the treatment composition were used along the length of the pipeline, each injection point being located approximately 15 to 20 miles apart. Treatment composition pill was sized to provide an approximately 3 mils coverage of the treatment composition on the walls of the pipe. The first injection of treatment composition was performed approximately 1 hour prior to the pig launch. The remaining injections followed after the first injection, one hour prior to the arrival of the pig at the injection point.

The pig was a steel mandrel pig with discs and brushes that was speed controlled due to the high velocity of the gas to provide proper cleaning. The project called for a "flush and brush" application, wherein the pig was used to both apply or spread the treatment composition while also removing materials as the pig was passed through the pipeline. This process is effective but may not be as effective as a "soak and brush" application, wherein the treatment is allowed to reside on the walls of the pipeline for a period of time before removal.

The procedure was repeated five additional times. The same pig configuration was used on each run. The treatments were successful in removing 16,000 pounds of solids during the cleaning operation in addition to the removed treatment composition. The treatments also reduced the dew point to a point less than that measured prior to the cleaning run.

Example 2

A cleaning treatment was performed on a 46-mile-long, 30-inch diameter dry gas line segment. This line was transferring 130 MMCF of dry gas per day. There were no customer gas feeds on the pipeline so that the treatment was carried out during daylight hours and without closing any customer feed valves. The need for a speed control pig was also not necessary for the cleaning project.

The cleaning procedure for the project was a "soak and brush" application. Two injection points were used on the pipeline. The first injection point was located just downstream from the pig launcher. The second was located approximately halfway between the pig launcher and the pig receiver. The treatment composition pill size was configured to provide approximately 5 mils of coverage per run. The treatment composition was comprised of a colloidal particle dispersion having silica nanoparticles with an average particle size of from 500 nm or less, a glycol, and glutaraldehyde. The treatment composition was injected approximately one hour prior to the pig launch. A bullet-nose, poly-foam, channel pig was used to spread the treatment composition along the interior surfaces of the pipeline. The second injection of treatment composition was made one hour prior to the arrival of the pig at the injection point. The treatment composition spread on the interior surfaces of the pipeline was allowed to reside overnight.

The next day, a mandrel style, disc and brush pig was then launched in the pipeline to remove the chemical and debris from the pipeline. The treatment composition application/removal process was repeated four additional times. After it was determined that the line was cleaned, approximately 20,000 pounds of solids was removed from the pipeline in addition to the removed treatment composition.

Example 3

A 24-inch natural gas pipeline 49 miles in length was tested to see the effectiveness of the treatment methods. The pipeline had an operating pressure of 750 psi, with an ambient temperature of 80° F., and was transferring 200 MMCF of dry gas per day. The pipeline was initially cleaned in a pigging operation using a steel mandrel pig with brushes without the use of any treatment composition. The cleaning operation resulted in no more than 5 lbs of any solids being removed from the pipeline.

The same pipeline was treated with a continuous treatment operation using a treatment composition that was comprised of a colloidal particle dispersion having positively charged silica nanoparticles with an average particle size of from 500 nm or less, a glycol, and glutaraldehyde. Five injection points were used, each spaced approximately 10 miles apart. The treatment composition was introduced at each injection point at a flow rate of 10 gals/day as an atomized spray. The continuous injection was carried out over a period of 30 days.

The continuous treatment operation was followed by a batch treatment operation at each injection point wherein 400 gallons of treatment composition was introduced into the pipeline.

A steel mandrel pig with brushes was then passed through the pipeline. Approximately 14,700 lbs of solids were removed from the pipeline in addition to the removed treatment composition.

Example 4

A continuous treatment operation was performed upstream of a compressor station on a 24-inch natural gas pipeline transporting 200 MMCF of dry gas per day. Before the treatment, the compressor station was experiencing significant clogging of the witch-hat filter located in the pipeline every 2 to 3 days. This was also resulting in at least two of the eight valves of the compressor station becoming fouled each week.

The treatment composition was injected at rate of 10 gals/day as an atomized spray. The treatment composition comprised a colloidal particle dispersion having positively charged silica nanoparticles with an average particle size of from 500 nm or less, a glycol, and glutaraldehyde. The continuous treatment operation was being performed for approximately 6 weeks. During that time the filters remained clean with no clogging and there was no fouling of the valves. Once the continuous treatment operation was stopped, within two weeks the filters began to clog and 4 out of the 8 valves became significantly fouled so that they had to be replaced.

While the invention has been shown in some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

I claim:

1. A method of treating a pipeline comprising:
   selecting a colloidal particle dispersion having inorganic nanoparticles with an average particle size of from 500 nm or less that exhibit properties of Brownian motion that facilitate penetration of solid deposits on interior surfaces of a pipeline;
   introducing a treatment composition comprising the colloidal particle dispersion into an interior of a pipeline by at least one of (A) introducing a batch amount of the treatment composition in a selected volume into the interior of the pipeline, and (B) continuously introducing the treatment composition at a selected rate into the interior of the pipeline; and
   allowing the composition to act upon the surfaces and materials adhering to the surfaces of the interior of the pipeline.

2. The method of claim 1, wherein:
   the treatment composition is introduced at a plurality of selected spaced apart injection points along a length of the pipeline.

3. The method of claim 2, wherein:
   the spaced apart injection points are spaced from 1 inch to 100 miles apart along the length of the pipeline.

4. The method of claim 1, wherein:
   the treatment composition is introduced continuously at a selected rate into the interior of the pipeline according to (B) as an atomized spray.

5. The method of claim 1, wherein:
   the treatment composition is introduced as a batch amount according to (A) over a period of from one minute to 24 hours.

6. The method of claim 1, wherein:
   the batch amount of the treatment composition is introduced according to (A) in a selected batch treatment volume $V_t$ where:

$$V_t = \pi \cdot [(R^2 - (R-T)^2] \cdot L$$

where R is the internal radius of a pipe being treated, T is from 0.1 mil to 10 mils, and L is a length of a pipeline segment being treated.

7. The method of claim 1, wherein:
   continuously introducing the treatment composition according to (B) comprises continuously introducing the composition into the interior of the pipeline at a selected rate Q where:

$$Q = 1.389E - 3 \cdot \pi \cdot [(R^2 - (R-T)^2] \cdot L/\text{hr}$$

where R is the internal radius of a pipe being treated, T is from 0.05 mil to 10 mils, and L is a length of a pipeline segment being treated.

8. The method of claim 7, wherein:
   the treatment composition is introduced at the selected rate Q over a period of from 1 hr to 1000 hrs.

9. The method of claim 1, wherein:
   the inorganic particles are silica nanoparticles.

10. The method of claim 9, wherein:
    the silica nanoparticles are functionalized with hydrophilic monomers and/or a mixture of hydrophilic and hydrophobic monomers.

11. The method of claim 1, wherein:
    the inorganic nanoparticles have an average particle size of from 300 nm or less.

12. The method of claim 1, wherein:
    the inorganic nanoparticles have an average particle size of from 0.1 nm to 300 nm.

13. The method of claim 1, wherein:
    the pipeline comprises at least one of a gas pipeline and a liquid petroleum pipeline.

14. The method of claim 1, wherein:
    the treatment composition has a pH of from 6 to 7.

15. The method of claim 1, wherein:
    the inorganic nanoparticles are present in the treatment composition in an amount of from 0.001 wt. % to 60 wt. % by total weight of the treatment composition.

16. The method of claim 1, wherein:
    the inorganic nanoparticles are present in the treatment composition in an amount of from 0.01 wt. % to 10 wt. % inorganic nanoparticles by total weight of the treatment composition.

17. The method of claim 1, wherein:
    the treatment composition further comprises at least one of a surfactant, an amphoteric surfactant, an ionic surfactant, an anionic surfactant, a cationic surfactant, a nonionic surfactant, a drying agent, a glycol, triethylene glycol, propylene glycol, ethylene glycol, glutaraldehyde, a bacteria-reducing agent, a biocide, a pH adjuster, water, an alcohol, a solvent, a dispersant, a non-terpene oil-based moiety, a terpene, a terpenoid, and limonene.

18. The method of claim 1, wherein:
    the treatment composition is free of any tetrakis(hydroxymethyl)phosphonium chloride (THPC), tetrakis(hydroxymethyl)phosphonium sulfate (THPS), methanol and ethanol.

19. A method of treating a pipeline comprising:
    selecting a colloidal particle dispersion having inorganic nanoparticles with an average particle size of from 500 nm or less that exhibit properties of Brownian motion that facilitate penetration of solid deposits on interior surfaces of a pipeline; and
    introducing a treatment composition comprising the colloidal particle dispersion into an interior of a pipeline by introducing a batch amount of the treatment composition in the interior of the pipeline in a selected batch treatment volume $V_t$ where:

$$V_t = \pi \cdot [(R^2 - (R-T)^2] \cdot L$$

where R is the internal radius of a pipe being treated, T is from 0.1 mil to 10 mils, and L is a length of a pipeline segment being treated; and allowing the composition to act upon the surfaces and materials adhering to the surfaces of the interior of the pipeline.

20. A method of treating a pipeline comprising:

selecting a colloidal particle dispersion having inorganic nanoparticles with an average particle size of from 500 nm or less that exhibit properties of Brownian motion that facilitate penetration of solid deposits on interior surfaces of a pipeline; and continuously introducing a treatment composition comprising the colloidal particle dispersion into an interior of the pipeline at a selected rate Q where:

$$Q = 1.389E-3 \cdot \pi \cdot [(R^2 - (R-T)^2)] \cdot L/\text{hr}$$

where R is the internal radius of a pipe being treated, T is from 0.05 mil to 10 mils, and L is a length of a pipeline segment being treated; and allowing the composition to act upon the surfaces and materials adhering to the surfaces of the interior of the pipeline.

\* \* \* \* \*